June 26, 1928.
P. C. AVERY
1,675,083
SAFETY FILLER FOR TANKS
Filed Jan. 10, 1927
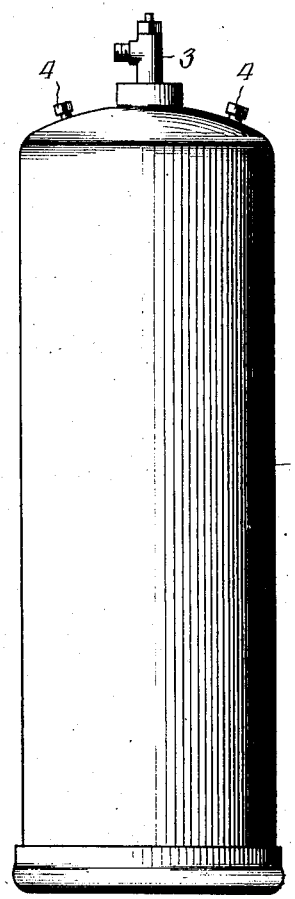
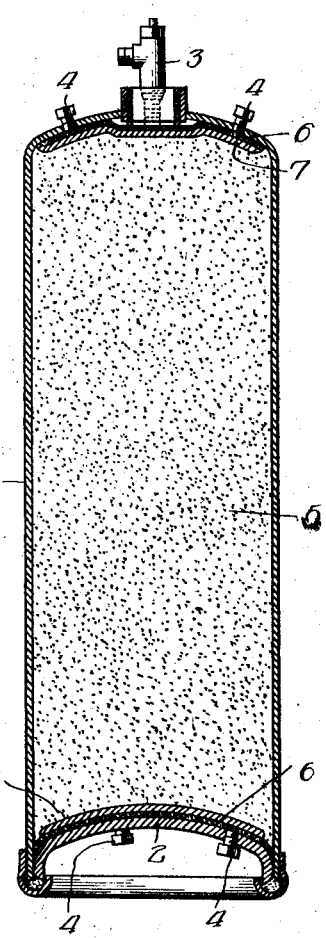
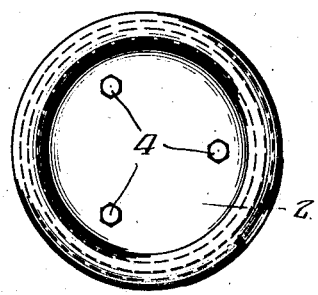
Inventor:
Percy C. Avery Patented June 26, 1928.

1,675,083

UNITED STATES PATENT OFFICE.

PERCY C. AVERY, OF WEST ALLIS, WISCONSIN, ASSIGNOR TO PRESSED STEEL TANK CO., OF MILWAUKEE, WISCONSIN, A CORPORATION OF WISCONSIN.

SAFETY FILLER FOR TANKS.

Application filed January 10, 1927. Serial No. 160,132.

The present invention relates to safety fillers for tanks.

The invention is particularly applicable and will be described with reference to acetylene tanks, though as the description proceeds it will be apparent that the invention has a broader application.

It is common practice to use an asbestos fibre filler in an acetylene tank, said filler having the function of absorbing the acetylene gas (which gas is dissolved in acetone or the like) and holding said gas in relatively small particles, whereby the danger of explosion is reduced.

The asbestos has certain features which are not necessary. It weighs considerable and its cost is considerable. As used, it is formed into round blocks which approximate closely the interior walls and dimensions of the tank, the asbestos being held with a binding material such as silicate of potash or silicate of soda. The filler is inserted in a plurality of sections. The blocks constituting said sections in being prepared must be baked, and this operation is rather slow and expensive. In order to bring the blocks to the proper fitting size, it is sometimes necessary to grind them, which adds further to the cost.

An object of the present invention is to provide a cheap filler which may be prepared in a minimum of time and which will keep completely filled the interior of the tank, with no tendency to settle, but with a tendency to expand slightly, which will continually keep the interior of the tank entirely filled with its porous mass.

Referring to the drawings—

Figure 1 is a view in elevation of a tank commonly used for storing a transparent acetylene or the like;

Figure 2 is a longitudinal sectional view of the tank shown in Figure 1; and

Figure 3 is a bottom plan view of the tank shown in the preceding figures.

According to the present invention, flax fibre or other resilient fibre is mixed in a dry state with gypsum, fuller's earth, silicate of aluminium, or the like, and packed into a tank. This packing is done dry, and is done under sufficiently high compression to completely fill said tank. This process has the advantage that the tank is used to its full capacity without danger of formation of pockets for free gas. The fibre, being resilient, has no tendency to sag, and will maintain its original shape indefinitely, expanding against the cylinder walls and heads.

Referring to the drawings, the numeral 1 indicates a tank, which tank is provided with the bottom member 2. At the head end of the tank 1 is the outlet valve 3. Fusible plugs 4—4 are provided at both ends, whereby in case of excess temperatures pressure within the tank is relieved through said fusible plugs. The numeral 5 indicates the filler of flax fibre or other resilient fibre mixed in a dry state with gypsum, fuller's earth, silicate of alumina, or the like. As indicated above, said filler is packed under sufficiently high pressure to completely fill the tank. The bottom member 2 may be welded or otherwise secured in place.

Disposed at both ends of the tank are the screens 6, preferably of wire mesh, which screens are disposed against the metal of the heads of the tank and provide lateral passageways for the gas and its solvent. Disposed in contact with said screens on the inner surfaces thereof are the fibre fabric filter pads 7, which may be composed of woven asbestos cloth, felt, or the like. The screens and pads have the function of preventing dust from the filler from clogging the outlets of the tank, and have the further and very valuable function of conducting the gas over a large area at each end of the tank, both for charging and discharging, whereby the gas flow is not localized at the valve exit or at the plug exits. The function of distributing the flow of gas results from the fact that the wire screen forms passageways from the entrance or exit openings of the tank to the periphery of said tank, whereby the flow of gas is distributed more or less uniformly throughout the cross sectional area of the tank, the felt being sufficiently porous to permit a certain portion of the gas to pass therethrough. The invention has the further advantage that in drawing off gas, inasmuch as the withdrawal takes place throughout a large cross sectional area of the tank, the danger of drawing off the solvent for the gas, that is—acetone or the like, is very greatly reduced.

The flax fibre above mentioned has peculiar advantages for the purpose served by the present invention, inasmuch as the structure of flax is tubular and permits relatively free passage of fluid therethrough. Such substances as wood, pith, charcoal and peat have cellular structures separated from each other by walls which offer obstructions to the free passage of fluid. The use of flax or equivalent substances having a tubular structure has the advantage that the tank may be readily charged and discharged.

According to the present invention, the fibre, being resilient, maintains its shape as packed into the tank, leaving no pockets for the collection of gas. The danger of explosion is thereby minimized.

What is claimed is—

1. An improvement in means for storing acetylene or other explosive gas comprising, in combination, an elongated tank, resilient fibre packed in said tank, an orifice at one end of said tank, and a screen disposed at said end of said tank adapted to distribute the flow of fluid between said filler and said orifice, said screen being substantially coextensive in area with the cross sectional area of the adjacent portion of said tank.

2. An improvement in means for storing acetylene or other explosive gas comprising, in combination, an elongated tank, resilient fibre packed in said tank, an orifice at one end of said tank, a screen disposed at said end of said tank adapted to distribute the flow of fluid between said filler and said orifice, and a porous pad disposed between said filler and said screen.

3. An improvement in means for storing acetylene or other explosive gas comprising a receptacle having an orifice, resilient fibre packed in said tank, a wire screen disposed against the inner wall of said tank at the region adjacent to said orifice for distributing the flow of fluid between said filler and said orifice throughout a relatively large area, said screen being substantially coextensive in area with the cross sectional area of the adjacent portion of said receptacle.

4. An improvement in means for storing acetylene or other explosive gas comprising a receptacle having an orifice, resilient fibre packed in said tank, a wire screen disposed against the inner wall of said tank at the region adjacent to said orifice for distributing the flow of fluid between said filler and said orifice throughout a relatively large area, and a porous pad disposed between said screen and said filler, said screen and said pad being substantially coextensive in area with the cross sectional area of the adjacent portion of said receptacle.

Signed at Milwaukee, Wisconsin, this 5th day of January, 1927.

PERCY C. AVERY.